J. N. COLLINS.
VEHICLE SIDE CURTAIN.
APPLICATION FILED MAY 24, 1913.
1,171,025.
Patented Feb. 8, 1916.
3 SHEETS—SHEET 2.
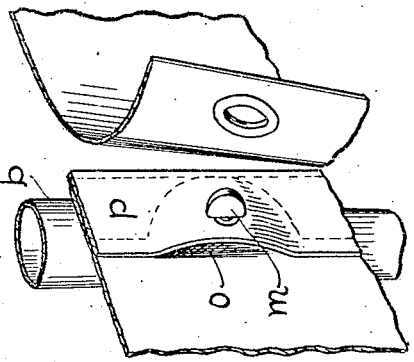
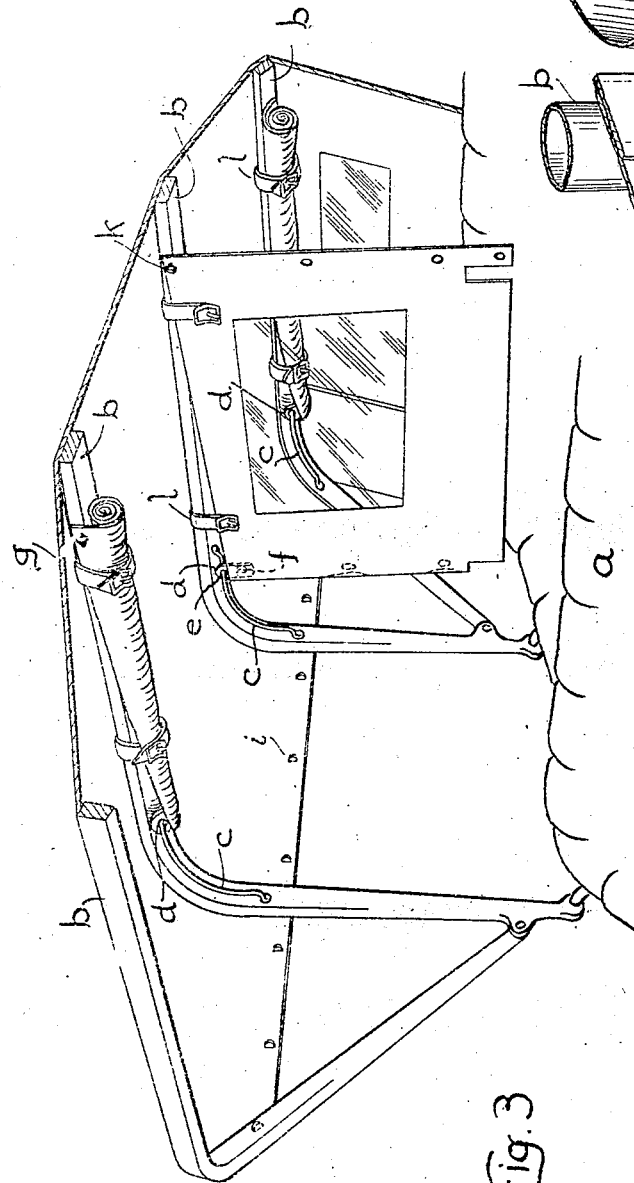

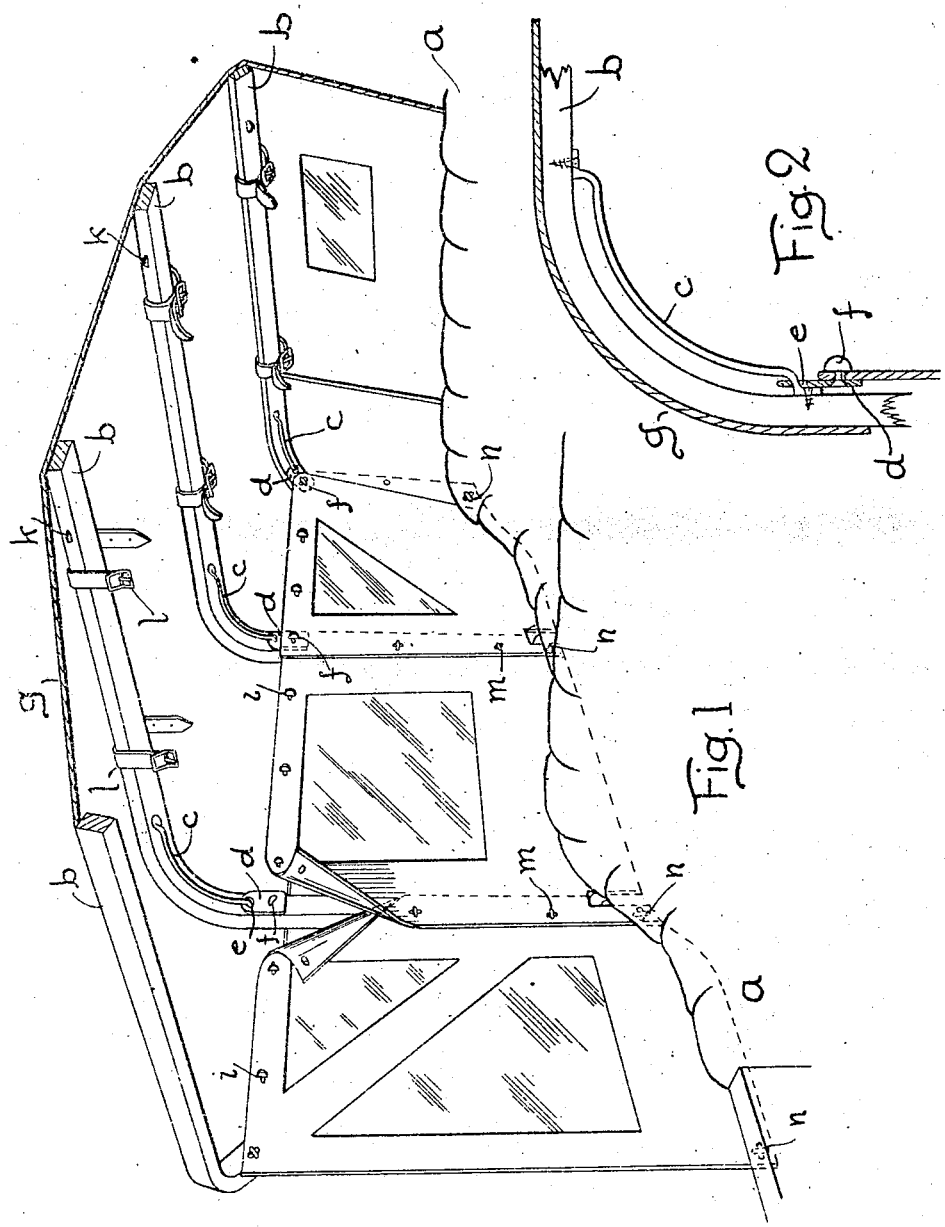

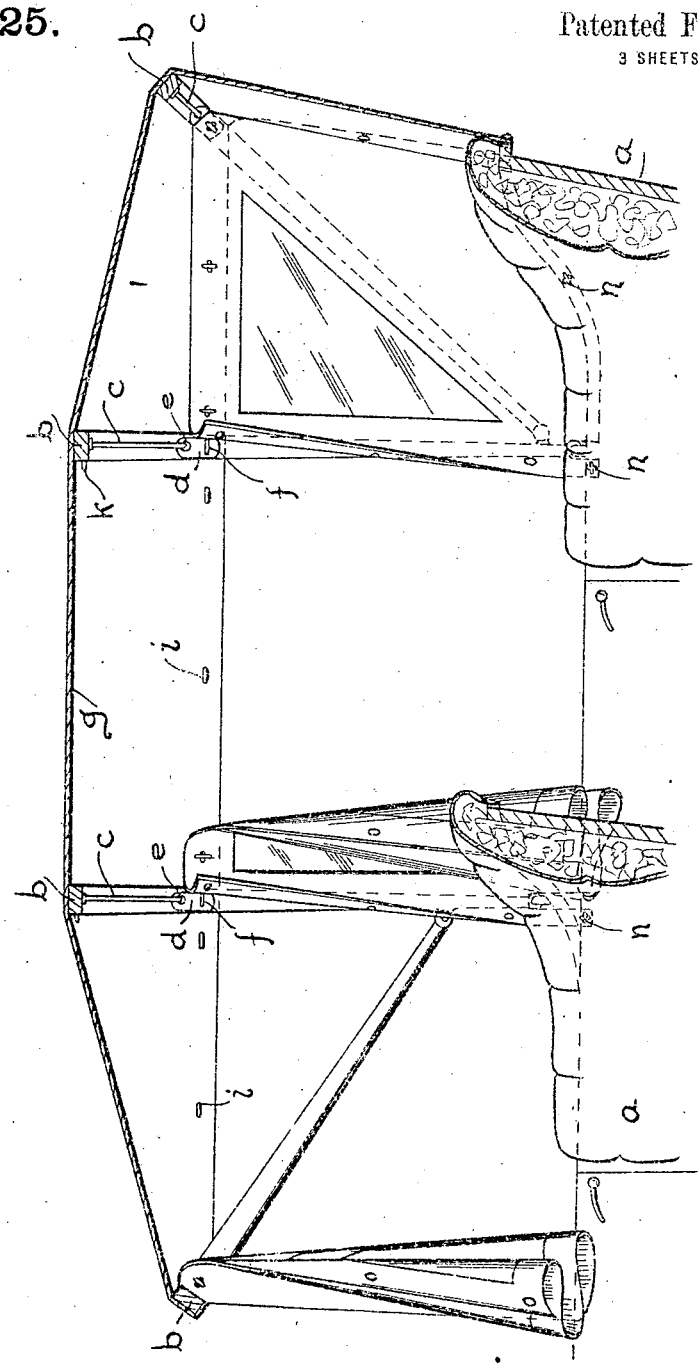

UNITED STATES PATENT OFFICE.

JEFFREY N. COLLINS, OF JACKSON, MICHIGAN.

VEHICLE SIDE CURTAIN.

1,171,025.

Specification of Letters Patent.

Patented Feb. 8, 1916.

Application filed May 24, 1913. Serial No. 769,571.

*To all whom it may concern:*

Be it known that I, JEFFREY N. COLLINS, a citizen of the United States, residing at Jackson, county of Jackson, State of Michigan, have invented a certain new and useful Improvement in Vehicle Side Curtains, and declare the following to be a full, clear, and exact description of the same, such as will enable others skilled in the art to which it pertains to make and use the same, reference being had to the accompanying drawings, which form a part of this specification.

This invention relates to side curtain mountings for vehicles and has for its object an improvement upon the invention shown in my Patent No. 1,006,448.

This introduces a material improvement in at least two ways. It makes the curtain readily detachable so that quick egress from or ingress into the vehicle can be had. With the curtain mounting shown in my previous application it was necessary for the occupant of the rear seat to reach way forward and unbutton the front of the central curtain before he could get out of the vehicle. In my present invention, inasmuch as the central curtain can be detached from the bracket or tab-carrier, all that it is necessary for the occupant of the vehicle to do is to unbutton the turn buttons directly at his side.

The second feature is that my improved curtain mounting does away with rigid turn-buttons attached to the bows. The turn buttons of one bow sometimes catch on some of the other bows when the bows are collapsed and tend to mar the bows. The turn-button being placed upon the tab it has sufficient flexibility so as to do away with this liability for injury.

In the drawings: Figure 1, is a perspective of the inside of an automobile body and top, one side has been cut away to get the view. This view shows the curtains in position for service. Fig. 2, is a sectional detail of the bracket or track upon which the curtain slides showing the detachable tab connection. Fig. 3, is the same view as shown in Fig. 1, showing two of the curtains stowed away and one of the curtains in position to be rolled up for storage. Fig. 4, is a detail of portions of two curtains showing the finger pocket behind each turn-button. Fig. 5, is a vertical section of the body and top showing the curtains dropped from the tabs to allow the occupants of the front and rear seats egress from the vehicle.

The body of an automobile is indicated as $a$. This body is a two-seated one which supports the customary bows $b$. There are four bows shown in the drawing which is the customary number. The second, third and fourth bows each have a curved bracket or track member $c$ on the inside of the bow at the point of curvature. These brackets may be screwed or otherwise fastened on. Before the bracket is fastened to the bow, a tab $d$ is placed upon the bracket by passing the rod-like bracket through the metal grommet $e$ at one end of the tab. At the other end of the tab is a turn-button $f$.

That portion of the weather-excluding fabric $g$ which extends to the side of the bows over the curvature is usually known as the "quarter". Along the inside of the quarter on a level with the turn button $f$ are placed a number of turn-buttons $i$, the exact number not being material. Each curtain has along its upper edge a number of eyelets equal to the number of turn buttons on the quarter adjacent the curtain and the added turn button on the tab.

The rear tab $d$ carries the rear curtain; the second tab from the rear carries the central curtain, and the forward tab carries the forward curtain. When it is desired to stow the curtains away from the position of service, it is only necessary to unbutton all the turn-buttons with the exception of those on the tabs, slide the curtains to the position shown in respect to the middle curtain in Fig. 3 and fasten the curtain by one of the eyelets and the turn-button $k$ to the cross bar portion of the bow. The curtain is then in position in front of the occupant of the vehicle where he may easily roll it up. Straps 1 are attached to the cross bar portion of the bow and when the curtain has been rolled up, the straps may be buckled over the roll, as shown in regard to the forward and rear curtains in Fig. 3.

The advantage of the tab is that when the occupant of the rear seat wishes to get out of the vehicle quickly, he is not obliged to lean or stand forward to unbutton the curtain at its forward end (although he may do this if he chooses), but all that he need do is to unfasten the turn buttons $m$ directly at his side and also the turn button $f$ of the tab. Ordinarily he can do this without even rising from his seat. The buttons m are attached to the rear curtain and when they are released from the eyelets, the button f unfastened and some of the buttons i on the quarter disengaged, the curtain will drop forward of its own weight and drape as shown in Fig. 4. In a similar manner the front curtain may be dropped to get it away from the side of the front seat occupant.

The turn buttons i allow of the buttoning of the curtain on the inside directly to the quarter, so that the curtain will hug the quarter and be a good weather-excluder at this point. The button f fastens two overlapping curtains to the tab, while the buttons m fasten two overlapping curtains to each other. These buttons are all on the inside where the occupant of the vehicle will have no trouble in reaching them. The curtains are fastened at the bottom to the outside of the vehicle by the turn buttons n which may be reached by the occupant without leaving his seat. This outside fastening at the bottom is preferable, so that the curtain will not shed water into the vehicle in rainy weather.

Where the curtains button together, I provide finger pockets o which underlie the turn-buttons m. In Fig. 4 it will be seen that the folded-over edge p of the left-hand curtain has an inside stitch that curves in and around the turn-button m so as to form the pocket o. Hence when the curtains are lapped over the fingers or thumb they may be easily slipped into the pocket o to hold the button m, while it is slipped through the eyelet and turned. This avoids the inconvenience and awkwardness of reaching to the outside. The detachable connection of the curtains to the tabs allows the curtains to be readily taken off the top if it is desired to stow them away at any other place or if it is necessary to repair them.

What I claim is:—

1. The combination with a vehicle top provided with bows and a weather-excluding fabric stretched only part way down over the sides of the bows to form the quarter, of a bracket on one of the bows at the curvature thereof, a tab slidably secured to the bracket to travel along the bow upon the bracket, a flexible curtain at one corner detachably secured to the free end of the tab, and means on the under side of the top for holding the curtain when it has been made into a package for stowage, the said curtain being brought into position for such stowage by the movements allowed by the tab and bracket.

2. In combination with a foldable vehicle top, a side curtain, means on the top near one of its sides for detachably connecting the outer corner of the curtain to the top, and permitting said curtain to be shifted to occupy an operative position longitudinally of the top or an inoperative position transversely of the top, means on the top for supporting the curtain in stored relation thereto, and means for movably supporting the detachable connecting means on the top so that the same may shift to various positions to prevent its obstructing the folding of the top, said last mentioned means comprising an elongated supporting bracket and the connecting means comprising a tab sleeved thereon and carrying a fastening device to engage the curtain.

In testimony whereof I sign this specification in the presence of two witnesses.

JEFFREY N. COLLINS.

Witnesses:
VIRGINIA C. SPRATT,
ROBERT N. VAN BUSKER.

Copies of this patent may be obtained for five cents each, by addressing the "Commissioner of Patents, Washington, D. C."